United States Patent [19]
Akiike

[11] Patent Number: 6,075,945
[45] Date of Patent: Jun. 13, 2000

[54] LENS APPARATUS

[75] Inventor: Michihiro Akiike, Utsunomiya, Japan

[73] Assignee: Canon Kabushiki Kaisha, Japan

[21] Appl. No.: 09/102,093

[22] Filed: Jun. 22, 1998

[30] Foreign Application Priority Data

Jun. 26, 1997 [JP] Japan .................................. 9-170069

[51] Int. Cl.⁷ .................................................. G03B 17/00
[52] U.S. Cl. .......................... 396/85; 396/133; 396/135; 396/136; 396/261
[58] Field of Search ................................ 396/52, 55, 85, 396/86, 87, 133, 135, 136, 261; 310/316, 317, 318; 318/116

[56] References Cited

U.S. PATENT DOCUMENTS

| 4,794,294 | 12/1988 | Shimizu et al. ........................ 310/316 |
| 4,896,179 | 1/1990 | Watanabe et al. ...................... 354/195.1 |
| 4,984,000 | 1/1991 | Watanabe et al. ...................... 354/195.1 |

FOREIGN PATENT DOCUMENTS

| 0700103 | 3/1996 | European Pat. Off. ........ H01L 41/04 |
| 08179184 | 7/1996 | Japan ............................... G02B 7/04 |

*Primary Examiner*—Russell Adams
*Attorney, Agent, or Firm*—Fitzpatrick, Cella, Harper & Scinto

[57] ABSTRACT

The present invention relates to a lens apparatus employed in a video camera. The present invention provides a lens apparatus, suited to manipulation of an operator, using a vibratory wave motor as a driving source for driving a photographing lens of the lens apparatus, wherein on the occasion of change of a driving direction, application of cyclic signals to a piezoelectric device of the motor is suspended and thereafter application of cyclic signals to the piezoelectric device is restarted.

5 Claims, 4 Drawing Sheets

LENS APPARATUS

BACKGROUND OF THE INVENTION

1. Field of the Invention

The present invention relates to control of vibration type driving apparatus for applying a cyclic signal to an electromechanical energy conversion element such as an electrostrictive device or a piezoelectric device to induce vibration of a vibrator and drive a driven body by use of this vibration, and to an apparatus such as a video camera or a lens for video camera using the vibration type driving apparatus as a driving source.

2. Related Background Art

There are known systems using a DC motor as a driving motor for focus, zoom, iris diaphragm, extender, macro, and so on in the video camera or in the lens for video camera.

Figure 5:
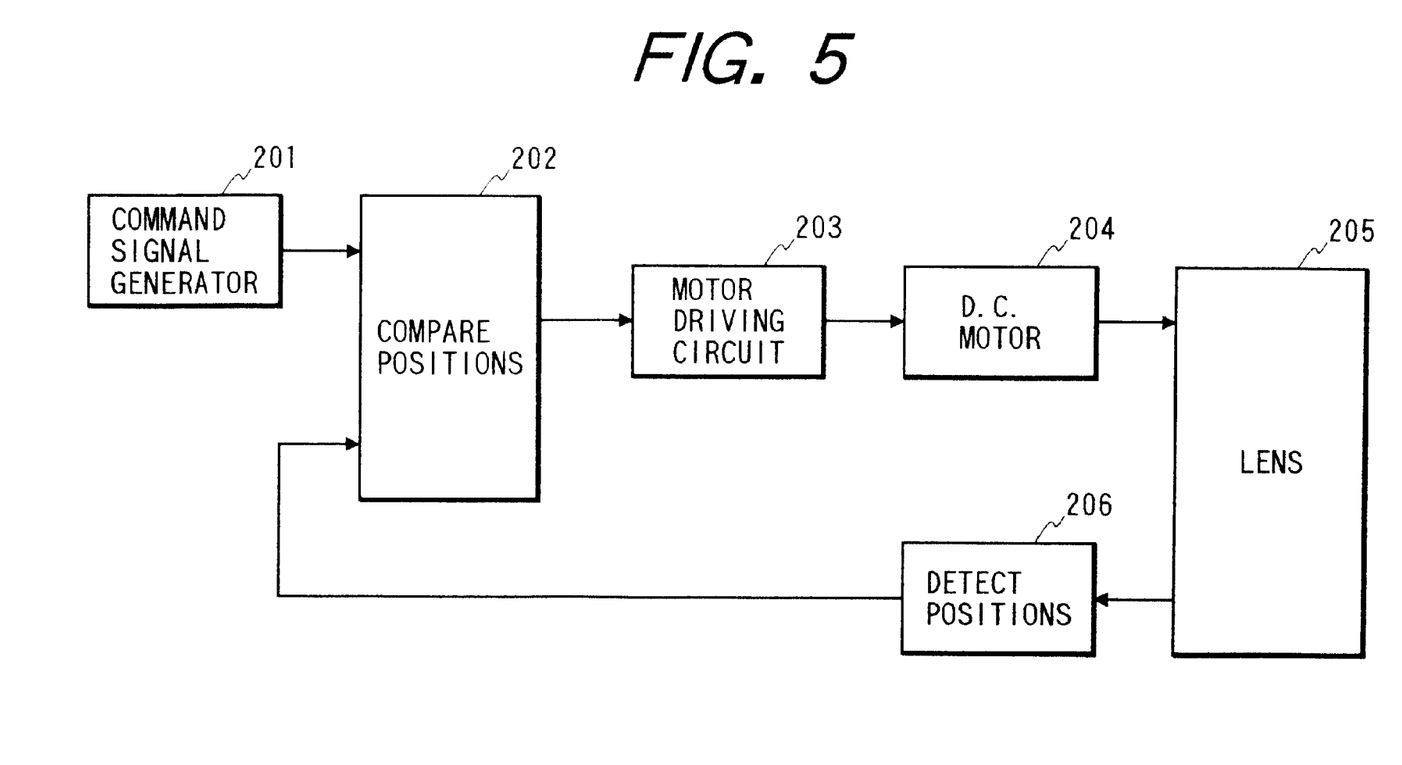
FIG. 5 is a block diagram of the conventional control system.

FIG. 5 illustrates a control system of a video camera lens using the conventional DC motor. In this control system a position detector 206 detects information of a real position of lens 205 and the information of real position is input into a position comparator 202. The position comparator 202 compares the real position of lens 205 detected, with a target position supplied from a command signal generator 201 and supplies a control signal to zero a difference between them to a motor driving circuit 203. When this control system is used for focusing, the command signal generator 201 is a potentiometer for detecting a focus control amount given by a cameraman, which supplies the target position (focus demand) ranging from nearest to infinity, to the position comparator 202. Then the motor driving circuit 203 applies a driving signal according to the control signal to the DC motor 204 to drive the lens 205 toward the target position.

In the above control system using the DC motor, however, when the target position is altered on the way of driving of the lens toward the target position, particularly when a new target position is a position which the lens has already passed, the driving direction of the lens has to be inverted. At this time the motor is reversed by inverting the polarity of the driving signal applied to the DC motor. Some time is necessary for actual inversion of rotating direction of the motor after the inversion of the polarity of driving signal, because of the inertia of the motor. This poses a problem that the system fails to follow quick inversion manipulation of focus demand conducted by the cameraman.

SUMMARY OF THE INVENTION

An object of the present invention is to provide a lens apparatus or a camera system for driving a photographing lens by use of a vibration type motor as a driving source for applying cyclic signals to an electro-mechanical energy conversion element to induce vibration of a vibrator and achieve driving force thereby, wherein for changing a driving direction, application of the cyclic signals to the electromechanical energy conversion element is once stopped and thereafter the application is restarted. The other objects of the present invention will become more apparent from the embodiments described below by reference to the drawings.

DESCRIPTION OF THE PREFERRED EMBODIMENTS

Figure 1:
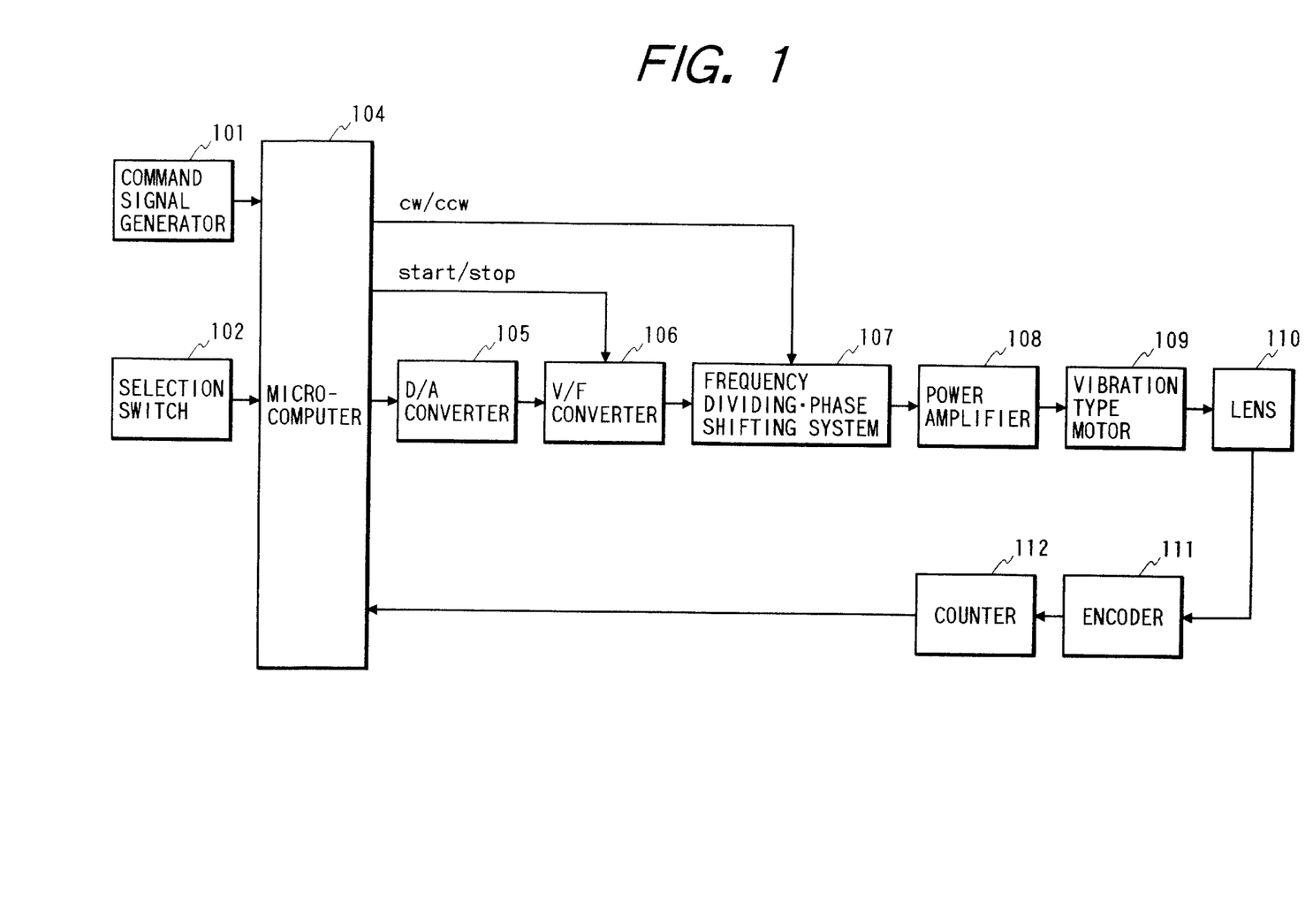
FIG. 1 is a block diagram of a control system in a lens apparatus for TV camera, which is the first embodiment of the present invention.

FIG. 1 illustrates a control system of a lens for TV camera, which is the first embodiment of the present invention. In this figure reference numeral 104 designates a microcomputer (hereinafter referred to as "micro") for controlling the operation of the lens apparatus, and 105 a D/A converter for converting a number-of-rotation control signal (digital signal) outputted from the micro 104 to an analog signal. Numeral 106 denotes a V/F converter, which outputs or stops a cyclic voltage according to an output voltage from the D/A converter 105 in response to an actuation control signal (start/stop) from the micro 104.

Numeral 107 represents a frequency divider/phase shifter, which divides the cyclic voltage from the V/F converter 106 to output two rectangular signals (cyclic signals) having a phase difference of $\pi/2$. A direction of the phase difference between the two rectangular signals corresponds to a rotating direction of the vibration type motor 109 and the phase difference direction is determined according to a direction control signal (cw/ccw) from the micro 104. Numeral 108 stands for a power amplifier, which amplifies the outputs of rectangular signals from the frequency divider/phase shifter 107 to voltage and current that can drive the vibration type motor 109.

Numeral 109 designates the vibration type motor (vibration type driving device), which is composed of a piezoelectric device (electro-mechanical energy conversion element) for causing vibration with application of the rectangular signals from the power amplifier 108 thereto, a vibrator induced to vibrate by the piezoelectric device, and a moving body kept in press contact with this vibrator and driven to rotate by vibration of the vibrator.

Numeral 110 denotes a lens, this lens 110 being mechanically connected to the moving body of the vibration type motor 109, so that the lens 110 moves in the optic-axis direction and rotates about the optic axis with rotation of the moving body. Numeral 111 indicates an encoder for detecting movement of the lens 110, and 112 a counter for counting detected signals by the encoder 111. These elements detect a movement amount of the lens 110.

Numeral 101 represents a command signal generator 101 for outputting the target position information according to the target position of the lens 110 set by manipulation of demand by the cameraman. Numeral 102 is a selection switch, and the cameraman can arbitrarily select a waiting time between stop and restart of rotation upon inversion of rotating direction of the vibration type motor 109, described hereinafter, by manipulating the selection switch.

In the control system constructed as described above, the micro 104 first calculates a difference between the target position information and the real position information of the lens 110 from the counter 112 to determine the motor rotating direction and the number of rotation of the motor necessary for zeroing the difference, i.e., for agreement of the real position with the target position, and then outputs a direction control signal corresponding to the motor rotating direction thus determined to the frequency divider/phase shifter 107 and a number-of-rotation control signal corresponding to the number of rotation of the motor to the D/A converter 105. The D/A converter 105 converts the numberof-rotation control signal to an analog signal and the V/F converter 106 converts this analog signal to a cyclic voltage. Further, the frequency divider/phase shifter 107 receives the direction control signal from the micro 104 and converts the cyclic voltage to two rectangular signals having a phase difference corresponding to the direction control signal. These two rectangular signals are amplified to the voltage and current values of predetermined level by the power amplifier 108 to be applied to the piezoelectric device of the vibration type motor 109. This rotates the vibration type motor 109, whereby the lens 110 is driven toward the target position.

Supposing here that on the way of movement of the lens 110 toward the target position a new target position is set by manipulation of demand by the cameraman and that the lens 110 has already passed this new target position, the rotating direction of the vibration type motor 109 needs to be inverted. In this case, the present embodiment is arranged so that the micro 104 interrupts output of the V/F converter 106, so as to suspend the application of rectangular signals to the vibration type motor 109. This immediately stops rotation of the vibration type motor 109 and movement of the lens 110.

After stop of the vibration type motor 109 and lens 110, the micro 104 waits until the waiting time selected through the selection switch 102 has elapsed. Then the micro 104 outputs the direction control signal to the frequency divider/phase shifter 107 and outputs the number-of-rotation control signal to the D/A converter 105, for moving the lens 110 to the new target position. This restarts the application of rectangular signals to the vibration type motor 109, so that the lens 110 is driven toward the new target position.

The operation of the control system as described above is carried out based on a program installed in the micro 104. This program will be described referring to the flowcharts shown in FIG. 2 and FIG. 3.

Figure 2:
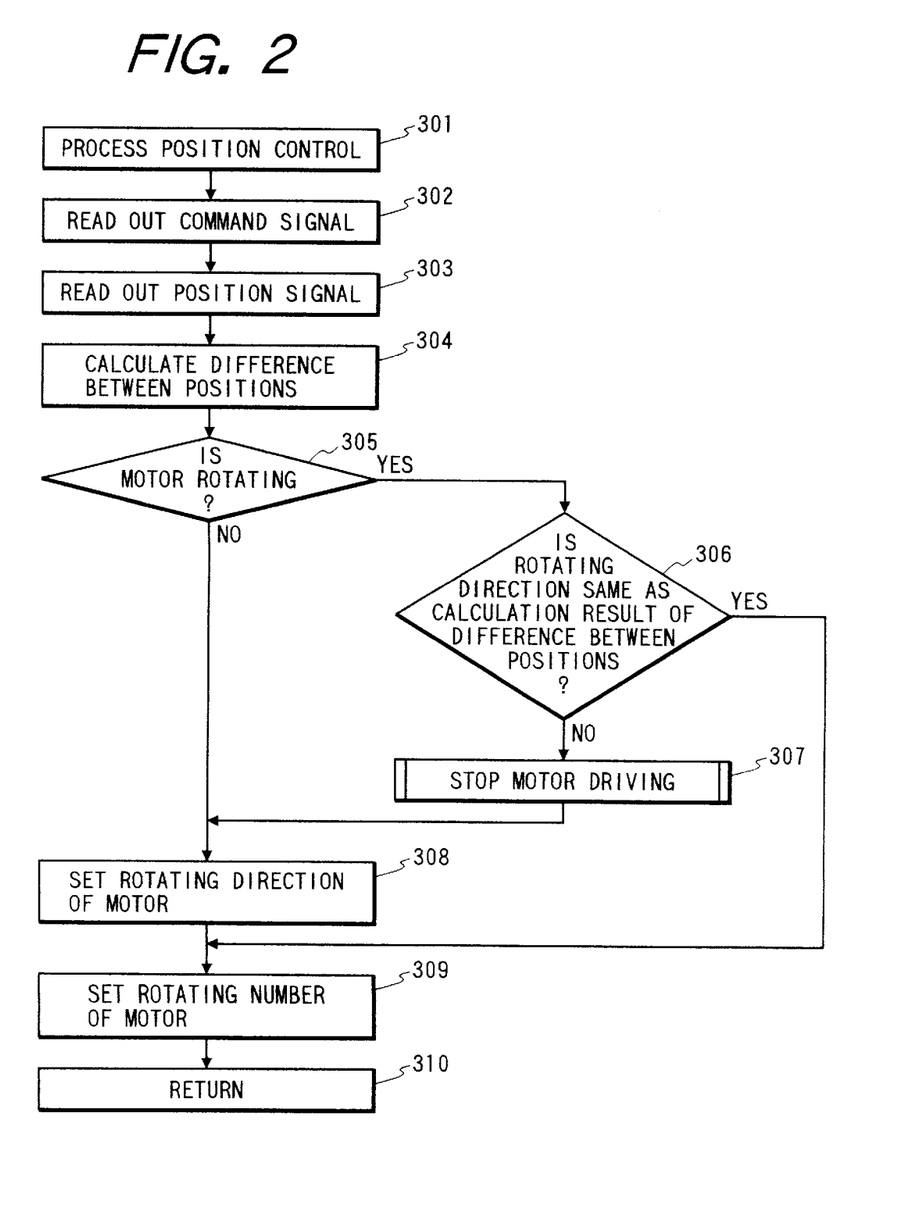
FIG. 2 is an overall operation flowchart of the above control system.

The overall flow of a position control process of the lens 110 will be described first referring to the flowchart of FIG. 2. After the position control process routine of the lens 110 is started in step 301, the micro reads the command signal according to the target position set by demand (focusing) manipulation of the cameraman in step 302. The micro 104 stores this as target position information in a memory inside the micro 104.

In step 303 the micro then reads the position signal corresponding to the real position of the lens 110 from the counter 112 to store it as real position information in the memory. In step 304 the micro then calculates the difference between the target position information and the real position information stored in the memory of the micro 104. In subsequent step 305 the micro reads the number-of-rotation control signal outputted to the D/A converter 105 and the actuation control signal outputted to the V/F converter 106, for checking the number of rotation of the vibration type motor 109. When the number-of-rotation control signal is zero or when the actuation control signal is stop, the micro makes a decision that the vibration type motor 109 stands still, and then the micro goes to step 308. When the number-of-rotation control signal is not zero and when the actuation control signal is start, the micro determines that the vibration type motor 109 is rotating, and goes to step 306.

In step 306 the micro reads the direction control signal outputted to the frequency divider/phase shifter 107 and compares the motor rotating direction indicated by this direction control signal with a motor rotating direction for zeroing the positional difference calculated in step 304. When these motor rotating directions agree with each other, the micro goes to step 309; when they disagree, the micro goes to step 307.

In step 307 the micro performs a process for stopping the vibration type motor 109. In this process the micro executes the program indicated by the flowchart shown in FIG. 3. First entering a driving stop process routine of the motor in step 501, the micro reads the output from the selection switch 102 in step 502 and converts it to a waiting time, corresponding thereto, for the application of rectangular signals to the vibration type motor 109. Then the micro stores it in the memory in the micro 104.

Figure 3:
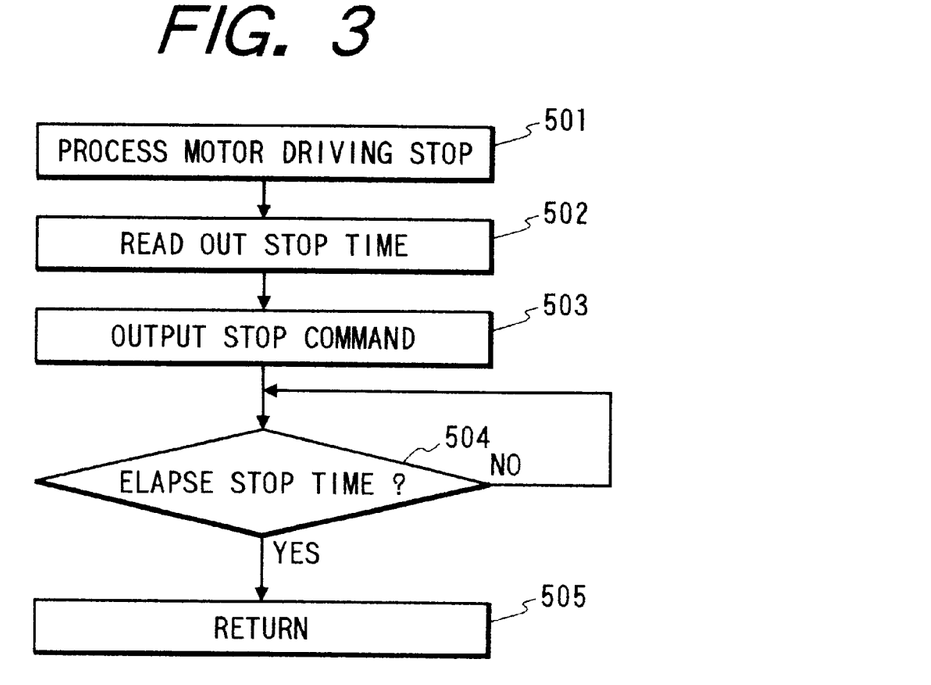
FIG. 3 is an operation flowchart of a stop process of the above control system.

In next step 503 the micro outputs the actuation control signal (stop) to the V/F converter 106 to stop generation of the cyclic voltage and to start the clock counter in the micro 104. Then the micro proceeds to step 504 to determine whether the count time by the clock counter after the stop of the motor reaches the application waiting time stored in the memory. When the time does not have elapsed yet, this step is repeated; when the time has elapsed, the micro proceeds to step 505 to go to step 308 of the main flow shown in FIG. 2.

In step 308 the micro outputs the direction control signal corresponding to the rotating direction of the vibration type motor 109 determined for decreasing the positional difference, based on the arithmetic result of step 304, to the frequency divider/phase shifter 107. In step 309 the micro outputs the number-of-rotation control signal corresponding to the number of rotation of the motor 109 determined for zeroing the positional difference, based on the arithmetic result of step 304, to the D/A converter 105. The vibration type motor 109 is reversed in this way, so that the lens 110 is driven toward the new target position.

According to the control described above, when on the way of movement of the lens 110 toward a target position a new target position is set by demand inversion manipulation of the cameraman and when the lens 110 has already passed this new target position, the application of cyclic signals to the vibration type motor 109 is suspended and application of cyclic signals for inverting the motor 109 is then restarted. Since upon the suspension of application of cyclic signals the vibration type motor 109 immediately stops rotating by frictional force between the vibrator and the moving body, without continuing to rotate because of the inertia as was the case with the DC motor, the driving direction of the lens 110 can be inverted at faster response speed in response to the demand inversion manipulation of the cameraman, as compared with the conventional control system using the DC motor.

In addition, because the waiting time from stop of the motor 109 to start of inversion can be arbitrarily set by manipulation of the selection switch 102, the response speed can be set by preference of the cameraman, thereby realizing an easy-to-use lens system.

The present embodiment was described as an example in which setting of response speed to demand inversion manipulation was effected by the manipulation signal of the selection switch 102, but a read signal from the memory may be used in place of the manipulation signal of the selection switch 102, for example.

The present embodiment was described as an example having the function to permit the response speed to the demand inversion manipulation to be arbitrarily set, but this function may be excluded. In this case, the stop process of the motor 109 in step 307 can be carried out according to the program shown in FIG. 4 instead of the program of FIG. 3.

Figure 4:
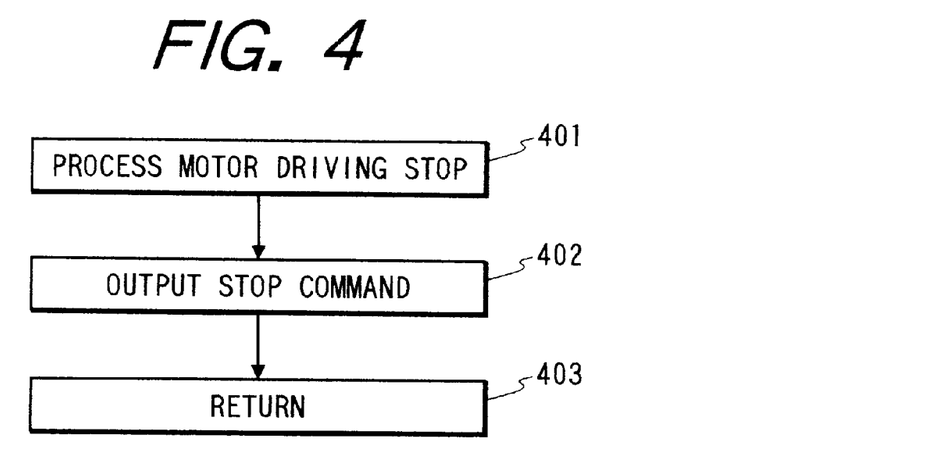
FIG. 4 is an operation flowchart of another stop process of the above control system.

Specifically, after the drive stop process routine of motor is started in step 401, step 402 is carried out to output the actuation control signal (stop) to the V/F converter 106 to stop generation of cyclic voltage. Then the micro proceeds immediately from step 403 to step 308 to start the inversion driving of the motor 109 without a waiting time.

The above embodiment was described as to the case wherein the focus demand (a dial or the like) manipulated by the cameraman was used for setting the target position of the lens, but the present invention can also be applied to lens apparatus for setting the target position according to a control signal from an autofocus device. In this case, the present invention can increase the speed of inversion operation after passage of the in-focus point in the so-called hill climbing process of autofocus.

As detailed above, the present invention realizes the structure in which on the occasion of inversion of driving direction of the driven body the application of cyclic signals to the electro-mechanical energy conversion element of the vibration type driving device is suspended and thereafter the cyclic signals for inverting the vibration type driving device are applied, so that the invention can achieve stable lens driving control with fast response speed to quick focus inversion manipulation of cameraman, for example.

When the apparatus is provided with the means for selecting the time after the suspension of the application of cyclic signals to the electro-mechanical energy conversion element and before the restart of application, the response time can be adjusted by preference of the cameraman, whereby the invention can realize easy-to-use lens apparatus or camera apparatus.

What is claimed is:

1. A lens apparatus or camera system for driving a photographing lens, using as a driving source a vibration type motor for applying cyclic signals of different phases to an electro-mechanical energy conversion element to vibrate a vibrator so as to create driving force, said lens apparatus or camera system comprising:

a direction setting circuit for setting a phase relation of said cyclic signals according to a signal indicating a driving direction of said lens; and a control circuit arranged so that on the occasion of changing said driving direction, application of said cyclic signals to said electro-mechanical energy converting element is suspended and thereafter application of the cyclic signals in the phase relation set by said direction setting circuit is started to said electro-mechanical energy conversion element.

2. The lens apparatus or camera system according to claim 1, further comprising a setting circuit for variably setting a time after said suspension of the application of said cyclic signals to said electro-mechanical energy conversion element and before start of the application of the cyclic signals in the phase relation set by said direction setting circuit, to said electro-mechanical energy conversion element.

3. The lens apparatus or camera system according to claim 1, wherein said control circuit stops the application of said cyclic signals to said electro-mechanical energy conversion element when a direction indicated by said signal indicating the driving direction is changed.

4. .The lens apparatus or camera system according to claim 1, wherein said control circuit stops formation of said cyclic signals when a direction indicated by the signal indicating the driving direction is changed.

5. The lens apparatus or camera system according to claim 1, said lens apparatus being a lens unit of a video camera.

* * * * *

UNITED STATES PATENT AND TRADEMARK OFFICE
CERTIFICATE OF CORRECTION

PATENT NO.    : 6,075,945
DATED         : June 13, 2000
INVENTOR(S)   : Michihiro Akiike It is certified that error appears in the above-identified patent and that said Letters Patent is hereby corrected as shown below:

Title page,
Item [73], Assignee, "Canon Kabushiki Kaisha, Japan" should read -- Canon Kabushiki Kaisha, Tokyo, Japan --.
Item [56], References Cited, U.S. PATENT DOCUMENTS, insert

| | | | |
|---|---|---|---|
| -- 4,812,699 | 3/1989 | Ogawa et al. | 310/323 |
| 5,028,833 | 7/1991 | Kawai | 310/323 |
| 5,402,030 | 3/1995 | Mukohjima | 310/323 |
| 5,500,565 | 3/1996 | Okubo | 310/316 |
| 5,543,879 | 8/1996 | Takagi | 354/202 |
| 5,585,686 | 12/1996 | Kataoka | 310/341 |
| 5,710,491 | 1/1998 | Takagi et al. | 318/116 |
| 5,739,621 | 4/1998 | Atsuta et al. | 318/116 |
| 5,744,897 | 4/1998 | Takagi et al. | 310/316 |
| 5,870,634 | 2/1999 | Sugaya et al. | 396/52-- |

FOREIGN PATENT DOCUMENTS, "08179184" should read -- 8-179184 --.

Column 1,
Line 10, "for" should read -- for a --;
Line 17, "the" (first occurrence) should read -- a --; and "for" should read -- for a --;
Line 23, "real" should read -- detected real --; and "detected," should be deleted;
Line 35, "on the way of" should read -- during --; and
Line 59, "BRIEF" should read -- ¶ BRIEF --.

Column 2,
Line 8, "for" should read -- for a --;
Line 10, "figure" should read -- figure, --;
Line 12, "105" should read -- 105 is --;
Line 60, "rotation" should read -- rotations --; and
Line 66, "rotation" should read -- rotations --.

Column 3,
Line 8, "of" should read -- of a --;
Line 13, "on the way of" should read -- during --; and
Line 54, "rotation" should read -- rotations --.

UNITED STATES PATENT AND TRADEMARK OFFICE
CERTIFICATE OF CORRECTION

PATENT NO.    : 6,075,945
DATED         : June 13, 2000
INVENTOR(S)   : Michihiro Akiike It is certified that error appears in the above-identified patent and that said Letters Patent is hereby corrected as shown below:

Column 4,
Line 19, "does not have" should read -- has not --;
Line 29, "rotation" should read -- rotations --;
Line 34, "on the" should read -- during --;
Line 35, "way of" should be deleted; and
Line 46, "at" should read -- at a --.

Column 5, line 34 - Column 6, line 34,
Claims 1-5 should be deleted and substituted with the following claims 1-5:

--1.    A lens apparatus or camera system for driving a photographing lens, using as a driving source a vibration type motor for applying cyclic signals of different phases to an electro-mechanical energy conversion element to vibrate a vibrator so as to create driving force, said lens apparatus or camera system comprising:

a direction setting circuit for setting a phase relation of said cyclic signals according to a signal indicating a driving direction of said lens; and a control circuit arranged so that on the occasion of changing said driving direction, application of said cyclic signals to said electro-mechanical energy conversion element is suspended and thereafter application of the cyclic signals in the phase relation set by said direction setting circuit is started to said electro-mechanical energy conversion element.

2.    The lens apparatus or camera system according to Claim 1, further comprising a setting circuit for variably setting a time after said suspension of the application of said cyclic signals to said electro-mechanical energy conversion element and before start of the application of the cyclic signals in the phase relation set by said direction setting circuit to said electro-mechanical energy conversion element.

3.    The lens apparatus or camera system according to Claim 1, wherein said control circuit stops the application of said cyclic signals to said electro-mechanical energy conversion element when a direction indicated by said signal indicating the driving direction is changed.

4.    The lens apparatus or camera system according to Claim 1, wherein said control circuit stops formation of said cyclic signals when a direction indicated by said signal indicating the driving direction is changed.

UNITED STATES PATENT AND TRADEMARK OFFICE
CERTIFICATE OF CORRECTION

PATENT NO. : 6,075,945
DATED : June 13, 2000
INVENTOR(S) : Michihiro Akiike

It is certified that error appears in the above-identified patent and that said Letters Patent is hereby corrected as shown below:

Column 5, line 34 - Column 6, line 34 (cont'd),

5. A video camera comprising a lens unit, wherein said lens unit comprises the lens apparatus or camera system according to Claim 1.--

Signed and Sealed this

Sixteenth Day of August, 2005

JON W. DUDAS
*Director of the United States Patent and Trademark Office*